United States Patent Office 2,865,959
Patented Dec. 23, 1958

2,865,959
CHLORINATION OF AROMATIC CARBOXYLIC ACID ESTERS

William G. Toland, San Rafael, Calif., assignor to California Research Corporation, San Francisco, Calif., a corporation of Delaware No Drawing. Application March 30, 1955
Serial No. 498,116

4 Claims. (Cl. 260—544)

The present invention relates to a novel process for the chlorination of aromatic carboxylic acid esters to produce the corresponding acid chlorides, these acid chlorides being useful in the prepartion of polyamides, and polyesters employed in fibers, films, surface coatings, and the like.

In accordance with the present invention, the esters of aromatic carboxylic acids, e. g., methyl benzoate and the methyl esters of the phthalic acids or mixtures of these, can be chlorinated thermally in liquid or vapor phase with or without catalyst, to produce the corresponding acid chlorides. In general, the overall reaction illustrated by dimethyl phthalate may be represented as follows:

$$\phi(CO_2CH_3)_2 + Cl_2 \rightarrow \phi(COCl)_2 + 2H_2CO$$

The reaction occurs at a practical rate at temperatures above about 300° F., with the upper limit being governed by that temperature above which undesirable chlorinolysis would become the predominant reaction to yield such products as hexachlorobenzene. Accordingly, the upper temperature limit is about 700° F., with an upper limit of 600° F. being preferred.

As indicated above, catalysts such as light, ferric chloride, antimony trichloride, cerium chloride, and zinc chloride can be used, but good yields can be obtained without the use of catalysts. Thus, yields of the phthaloyl dichlorides, for example, have been found to range between about 80% and 90% of theory of purified product, conversions being 100%. Reaction times can vary from less than 1 hour to 3 hours, usual reaction times being of the order of 2–3 hours.

A suitable aromatic carboxylic acid ester can be defined as one obtained by the esterification of an aromatic carboxylic acid being free of chlorine-reactive substituent groups on the ring or aromatic nucleus, e. g., alkyl groups. While the preferred aromatic carboxylic acid contains a single aromatic nucleus, aromatic carboxylic acids of two or more fused or unfused aromatic nuclei are also suitable. Examples of suitable acids are benzoic, orthophthalic, isophthalic and terephthalic acids, chlorobenzoic, naphthoic, diphenic acid, and trimesic acids. The preferred acids are benzoic and the aromatic dicarboxylic acids, that is, the phthalic acids.

The alcohol employed in the preparation of the ester can be aliphatic or aromatic, monohydric or polyhydric, primary, secondary or tertiary. Alcohols containing 1 to 8 carbon atoms are particularly preferred, with aliphatic monohydric alcohols of 1 to 3 carbons being most advantageously employed. The resulting esters will yield in addition to acid chlorides, aldehydes in the case of an ester derived from a primary alcohol, ketones from a secondary alcohol, the tertiary alcohol ester hydrolyzing and further reacting to a large extent to tertiary alcohol, tertiary alkyl chloride, dichlorides, and olefin. Specific examples of suitable alcohols are methanol, ethanol, propanol, butanol, amyl alcohol, ethylene glycol, propylene glycol, glycerol, diethylene glycol, benzyl alcohol, benzyl carbinol, isopropanol, and tertiary-butanol.

The reaction is conveniently carried out in suitable apparatus such as a vertical tube or pipe fitted with a jet or sparger at the base, or a turbo mixer, equipped with gas inlet, reflux condenser and exit lines for the withdrawal of hydrogen chloride and chlorine recovery. In carrying out the reaction the aromatic carboxylic acid ester is heated to the besired temperature and while stirring the chlorine is passed thereinto. A solvent for the reaction, such as biphenyl or perchlorobutadiene, may be used, but is not required. At the start of reacton the $Cl_2$ or gaseous chlorine indicated in the above equation may be introduced into the reaction zone at temperatures nearer the lower limits of the range whereby to form the chlorinated esters, e. g., chloromethyl esters, which then at the higher temperatures decompose to acid chlorides and the appropriate carbonyl compound. Upon completion of the reaction as indicated by cessation of chlorine uptake and hydrogen chloride evolution, the contents are withdrawn from the turbo mixer and fractionated to recover the acid chloride.

The following examples are given to illustrate the practice of the invention:

Example 1

A glass turbo mixer equipped with gas inlet, reflux condenser, with exit line connected to a water scrubber for hydrogen chloride removal, and a Dry Ice trap for chlorine recovery, was charged with 200 g. of methyl benzoate. The reactor was heated with stirring to 390° F. and chlorine introduced at a rate of 1.9 g./minute for three hours and then at 1.3 g./minute for an additional three hours. A total of 576 g. of chlorine was introduced and 235 g. recovered. By titration, the presence of 4.61 moles of acid was found in the water scrubber. A total of 204.5 g. of liquid products was removed from the turbo mixer with a neutral equivalent of 79.8 (theoretical 70.3). This material was fractionally distilled through a one-foot helices packed column. Cut No. 1 consisted of 192.7 g. boiling point 113–114° C. at 50 mm. pressure, saponification equivalent 71.3. A pot residue of 8.8 g. remained. Cut No. 1 is benzoyl chloride obtained, in this case, in a 93.3% yield of theory.

Example 2

Using the equipment of the preceding example, a charge of 200 g. of dimethyl terephthalate was heated to 430° F. and chlorine introduced at a rate of 1.8 g./minute over a period of approximately three hours. At the end of this time, a total of approximately 212 g. of product was removed from the turbo mixer, with a saponification equivalent of 52.3. The theoretical for terephthaloyl dichloride is 50.7. A 75 g. aliquot of this material was fractionally distilled to obtain the following fractions:

| Cut No. | Grams | Boiling Point °C., at 35 mm. | Saponification Equivalent |
|---|---|---|---|
| 1 | 44.0 | 169–175 | 50.9 |
| 2 | 9.9 | 175–190 | |
| 3 | 17.0 | 190–200 | 56.3 |

A total of 6.3 g. of bottoms remained.

Example 3

Using the same equipment and procedure as in the previous example, 200 g. of dimethyl isophthalate was chlorinated at 430° F. A total of 211.5 g. of products was obtained with a saponification equivalent of 53.0.

Purification by fractional distillation yielded the following fractions:

| Cut No. | Grams | Boiling Point, °C., at 35 mm. | Saponification Equivalent |
|---|---|---|---|
| 1 | 69.7 | 170-173 | 51.0 |
| 2 | 71.6 | 173-175 | 51.05 |
| 3 | 21.4 | 175-181 | 51.7 |

An additional 12.9 g. of somewhat higher boiling stock was obtained, saponification equivalent 51.9. A residue of 23.1 g. remained. Essentially all of the overhead product consisted of isophthaloyl dichloride.

Example 4

Using the equipment and procedure of the preceding examples, 200 g. of ethyl benzoate was heated to 380° F., and chlorine introduced at a rate of 1.54 g./minute for 3¼ hours. Products were then blown with nitrogen to displace free chlorine. There was obtained 270.3 g. of crude products, neutral equivalent 71.6. A total of 301 g. of chlorine was passed, and 118.4 g. recovered. A total of 3.52 moles of aqueous acid, largely hydrochloric, had been absorbed in the scrubber as determined by titration. The products were distilled through a 1 foot helices packed column to yield 163 g. of benzoyl chloride, neutral equivalent 69 (theoretical 70.3) and 52 g. of higher boiling chlorinated products.

Example 5

The preceding example was repeated with 164.2 g. of isopropyl benzoate at 350° F. until a total of 50 g. of chlorine was absorbed. Distillation of the products gave 104 g. of benzoyl chloride, 65 g. of unconverted isopropyl benzoate, and a higher boiling, chlorine-containing residue.

Example 6

Following the procedure of the preceding examples, 213 g. of benzyl benzoate was chlorinated at 400° F. at a rate of 1.54 g./minute of chlorine for 4.5 hours. Distillation of the products yielded 170 g. of benzoyl chloride.

Example 7

Using the system of the preceding examples, methylnaphthoate was chlorinated at 380° F. until no more chlorine uptake was observed. Distillation yielded naphthoyl chloride, boiling point 165-170° C. at 15 mm. mercury pressure in high yield.

Obviously, many modifications and variations of the invention, as hereinbefore set forth, may be made without departing from the spirit and scope thereof and, therefore, only such limitations should be imposed as are indicated in the appended claims.

I claim:
1. The process of producing an acid chloride consisting essentially of the acid chloride of an aromatic dicarboxylic acid, which comprises forming a diester from said aromatic dicarboxylic acid and an alcohol, and reacting said ester in a reaction zone at from about 300° F. to 700° F. for from about 1 to 3 hours with gaseous chlorine introduced into said reaction zone from an external source, whereby the desired acid chloride is obtained.

2. The process for producing aromatic carboxylic acid chlorides from a methyl ester of an aromatic carboxylic acid which comprises heating said ester in a reaction zone for a period of about 1 to 3 hours at a temperature within the range of 300° to 700° F. while passing gaseous chlorine therethrough, and collecting an acid chloride consisting essentially of the acid chloride of said aromatic carboxylic acid.

3. The process for producing terephthaloyl dichloride from dimethyl terephthalate which comprises heating dimethyl terephthalate in a reaction zone for a period of about 1 to 3 hours at a temperature within the range of 300° to 700° F. while passing gaseous chlorine therethrough, and collecting the terephthaloyl dichloride.

4. The process for producing isophthaloyl dichloride from dimethyl isophthalate which comprises heating dimethyl isophthalate in a reaction zone for a period of about 1 to 3 hours at a temperature within the range of 300° to 700° F. while pasing gaseous chlorine therethrough, and collecting the isophthaloyl dichloride.

References Cited in the file of this patent
FOREIGN PATENTS 41,065  Germany  Nov. 11, 1887

OTHER REFERENCES

Autenrieth, Berichte, vol. 40, p. 746 (1907).
Mellor's Modern Inorganic Chemistry, p. 771 (1952).